United States Patent
Kobayashi et al.

(10) Patent No.: US 10,868,764 B2
(45) Date of Patent: Dec. 15, 2020

(54) ROUTE CALCULATION CONTROL DEVICE AND ROUTE CALCULATION CONTROL METHOD

(71) Applicant: NIPPON TELEGRAPH AND TELEPHONE CORPORATION, Chiyoda-ku (JP)

(72) Inventors: Masahiro Kobayashi, Musashino (JP); Toshiaki Tsuchiya, Musashino (JP); Ryutaro Matsumura, Musashino (JP); Takumi Kimura, Musashino (JP); Katsunori Noritake, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 96 days.

(21) Appl. No.: 16/094,578

(22) PCT Filed: Apr. 25, 2017

(86) PCT No.: PCT/JP2017/016297
§ 371 (c)(1),
(2) Date: Oct. 18, 2018

(87) PCT Pub. No.: WO2017/199704
PCT Pub. Date: Nov. 23, 2017

(65) Prior Publication Data
US 2019/0104071 A1 Apr. 4, 2019

(30) Foreign Application Priority Data
May 17, 2016 (JP) .................. 2016-098807

(51) Int. Cl.
*H04L 12/813* (2013.01)
*H04W 72/04* (2009.01)
*H04L 12/717* (2013.01)

(52) U.S. Cl.
CPC .............. *H04L 47/20* (2013.01); *H04L 45/42* (2013.01); *H04W 72/0493* (2013.01)

(58) Field of Classification Search
None
See application file for complete search history.

(56) References Cited

U.S. PATENT DOCUMENTS

2002/0152025 A1* 10/2002 Shimada ............ G01C 21/3484
701/410
2003/0137932 A1* 7/2003 Nishioka ............. H04L 41/0668
370/216

(Continued)

FOREIGN PATENT DOCUMENTS

JP 2001-111613 A 4/2001
JP 2008-48114 A 2/2008

(Continued)

OTHER PUBLICATIONS

Yu, M. et at, "Rethinking Virtual Network Embedding: Substrate Support for Path Splitting and Migration," ACM SIGCOMM Computer Communication Review, vol. 38, No. 2, 2008, 9 total pages.

(Continued)

*Primary Examiner* — Andrew C Oh
(74) *Attorney, Agent, or Firm* — Oblon, McClelland, Maier & Neustadt, L.L.P.

(57) ABSTRACT

A route calculation control device includes a calculator configured, among a plurality of nodes constituting a physical network having a plurality of sections to which respective policies different from each other are applied when allocating resources, based on a policy corresponding to a section including a start point node specified in a use request of the resources of the physical network, to calculate a route from the start point node to an end point node specified in the use request; and a controller configured to replace the start point node, among nodes constituting the route calcu- (Continued)

lated by the calculator, with a first node included in a section different from the section including the start point node, so as to cause the calculator to calculate a route to the end point node. This enables to allocate resources to a network that includes multiple sections to which different policies are applied.

4 Claims, 11 Drawing Sheets

(56) References Cited

U.S. PATENT DOCUMENTS

| | | | |
|---|---|---|---|
| 2004/0064541 A1 | 4/2004 | Ebata et al. | |
| 2007/0064613 A1* | 3/2007 | Qian | H04L 45/12 370/238 |
| 2007/0074281 A1* | 3/2007 | Ikeda | H04L 67/24 726/13 |
| 2008/0117829 A1* | 5/2008 | Nakano | H04L 43/0864 370/247 |
| 2008/0319645 A1* | 12/2008 | Kumagai | G01C 21/3484 701/533 |
| 2009/0221310 A1* | 9/2009 | Chen | H04L 69/08 455/466 |
| 2009/0265092 A1* | 10/2009 | Lin | G08G 1/096894 701/532 |
| 2012/0120961 A1* | 5/2012 | Yang | H04W 40/28 370/400 |
| 2012/0263186 A1* | 10/2012 | Ueno | H04L 45/38 370/401 |
| 2014/0114564 A1* | 4/2014 | Callaghan | G01C 21/20 701/416 |
| 2014/0241366 A1* | 8/2014 | Smith | H04L 45/74 370/392 |
| 2015/0236948 A1* | 8/2015 | Dunbar | H04L 45/22 370/225 |
| 2015/0326473 A1* | 11/2015 | Dunbar | H04L 12/4633 370/392 |
| 2015/0381406 A1* | 12/2015 | Francois | H04L 45/28 370/218 |
| 2016/0164786 A1 | 6/2016 | Fukuda | |
| 2016/0262044 A1* | 9/2016 | Calin | H04L 45/64 |
| 2016/0301595 A1 | 10/2016 | Ashida | |
| 2017/0302470 A1* | 10/2017 | Clark | H04L 41/0893 |
| 2018/0006893 A1* | 1/2018 | Iovanna | H04L 41/0896 |
| 2018/0210420 A1* | 7/2018 | Kaneko | G05B 19/4069 |

FOREIGN PATENT DOCUMENTS

| | | |
|---|---|---|
| JP | 2010-199882 A | 9/2010 |
| JP | 2012-257146 A | 12/2012 |
| JP | 2015-12554 A | 1/2015 |
| WO | WO 2015/079615 A1 | 6/2015 |

OTHER PUBLICATIONS

Chowdhury, M. et al, "ViNEYard: Virtual Network Embedding Algorithms With Coordinated Node and Link Mapping," IEEE/ACM Transactions on Networking, vol. 20, No. 1, Feb. 1, 2012, pp. 206-219.

Kobayashi, M. et al, "A Study on Effective Resource Allocation Method to Virtual Network with Service Accommodation Degree," The Institute Of Electronics, Information and Communication Engineers, Technical Report NS2015-151, Jan. 2016, pp. 29-34 (with English abstract).

Trinh, T.et al, "Quality of Service Using Careful Overbooking for Optimal Virtual Network Resource Allocation," The 8$^{th}$ Electrical Engineering/Electronics, Computer, Telecommunications and Information Technology (ECTI) Association of Thailand—Conference 2011, pp. 296-299.

Rahman, M. R. et al, "SVNE: Survivable Virtual Network Embedding Algorithms for Network Virtualization," IEEE Transactions on Network and Service Management, vol. 10, No. 2, Jun. 2003, pp. 105-118.

Su, S. et al, "Energy-Aware Virtual Network Embedding," IEEE/ACM Transactions on Networking, vol. 22, No. 5, Oct. 2014, pp. 1607-1620.

International Search Report dated Jun. 20, 2017 in PCT/JP2017/016297 filed Apr. 25, 2017.

* cited by examiner

ROUTE CALCULATION CONTROL DEVICE AND ROUTE CALCULATION CONTROL METHOD

TECHNICAL FIELD

The present invention relates to a route calculation control device and a route calculation control method.

BACKGROUND ART

Progress of virtualization technologies has extended the application of the virtualization technologies not only in the field of cloud computing but also in the field of communication networks. For example, the fifth-generation mobile communication networks conceptualize flexible network control by application of the virtualization technologies.

Figure 1:
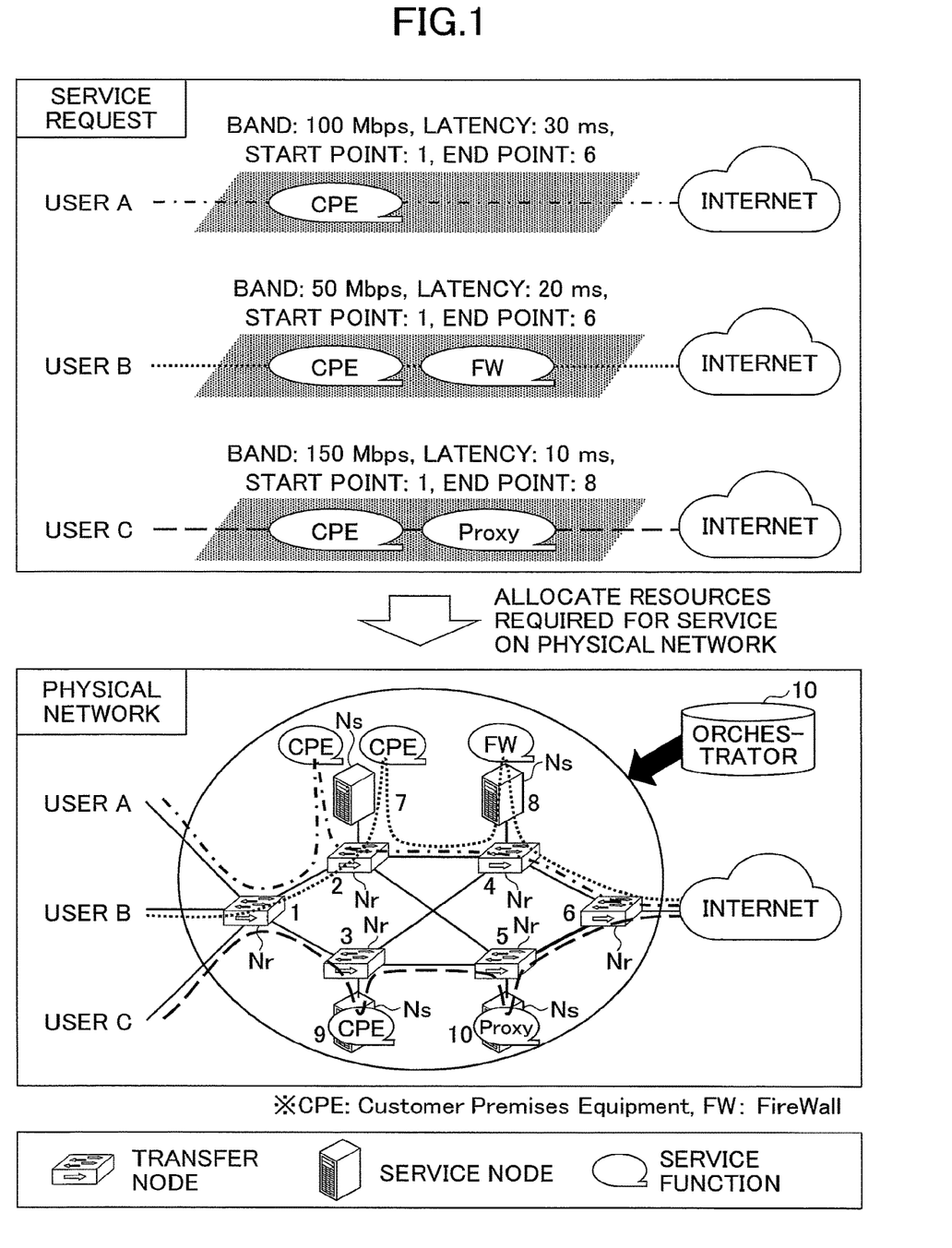
FIG. 1 is a diagram illustrating an example of allocations of physical resources upon a service request.

In virtualization in a communication network, a service provider can provide flexible services by readily utilizing network resources and service functions prepared in advance on the communication network (FIG. 1). Technologies that realize these are NFV (Network Functions Virtualization) and SFC (Service Function Chaining). The NVF technology enables to provide service functions of a communication service provider as software on general-purpose servers, which have conventionally been implemented by dedicated hardware such as routers and gateways. Therefore, a service function becomes executable on any server that exists on the network. Also, the SFC technology enables to transmit a packet flow of user to a designated service function in a designated order, and thereby, enables to readily combine service functions.

When providing services in a virtual network, it is important for the network provider to efficiently allocate resources of a physical network so as to satisfy requirements for each service. This resource allocation problem is called a virtual network embedding (VNE) problem, and many technologies have been proposed. In the existing technology, a given physical network is modeled as a weighted undirected graph, and physical network resources are allocated based on a certain policy so as to satisfy the requirements of the services. A variety of resource allocation policies have been proposed, which includes minimization of the resource usage rate (Non-Patent Document 1, Non-Patent Document 2), maximization of the number of accommodated services (Non-Patent Document 3), maximization of user quality (Non-Patent Document 4), maximization of fault tolerance (Non-Patent Document 5), minimization of power consumption (Non-Patent Document 6), and the like.

RELATED ART DOCUMENTS

Non-Patent Documents

Non-Patent Document 1: M. Yu et al., "Rethinking Virtual Network Embedding: Substrate Support for path splitting and migration", ACM SIGCOMM Computer Communication Review, Vol. 38, No. 2, pp. 17-29, 2008

Non-Patent Document 2: M. Chowdhury et al., "Vineyard: Virtual network embedding algorithms with coordinated node and link mapping," IEEE/ACM Trans. Networking, vol. 20, no. 1, pp. 206-219, 2012

Non-Patent Document 3: Kobayashi, Matsumura, Kimura, Tsuchiya, Noritake, "A Study on Effective Resource Allocation Method to Virtual Network with Service Accommodation Degree", IEICE technical report, NS2015-151

Non-Patent Document 4: T. Trinh et al., "Quality of service using careful overbooking for optimal virtual network resource allocation," in Proc. ECTI-CON, 2011

Non-Patent Document 5: M. R. Rahman et al, "SVNE: Survivable Virtual Network Embedding Algorithms for Network Virtualization," IEEE Trans. Network and Service Management, Vol. 10, No. 2, pp. 105-118, 2013

Non-Patent Document 6: S. Su et al., "Energy-Aware Virtual Network Embedding," IEEE Trans. Networking, Vol. 22, No. 5, pp. 1607-1620, 2014

SUMMARY OF INVENTION

Problem to be Solved by the Invention

The conventional resource allocation technology has been implemented on the premise that resource allocation is executed based on a policy uniformly specified on the network, and does not consider the case where multiple policies are applied. In practical network operations, there may be not only cases where resource allocation based on one policy on the entire network needs to be performed, but also cases where resource allocation based on different policies need to be applied only to some subnetworks. For example, as illustrated in FIG. 2, there may a case where an allocation is performed to maximize fault tolerance on a subnetwork with a high probability of disaster due to lasting heavy rain; an allocation is performed to maximize user quality on a subnetwork that has a sufficient margin in the amount of resources; and an allocation is performed on the other subnetworks to maximize the number of accommodated services.

Figure 2:
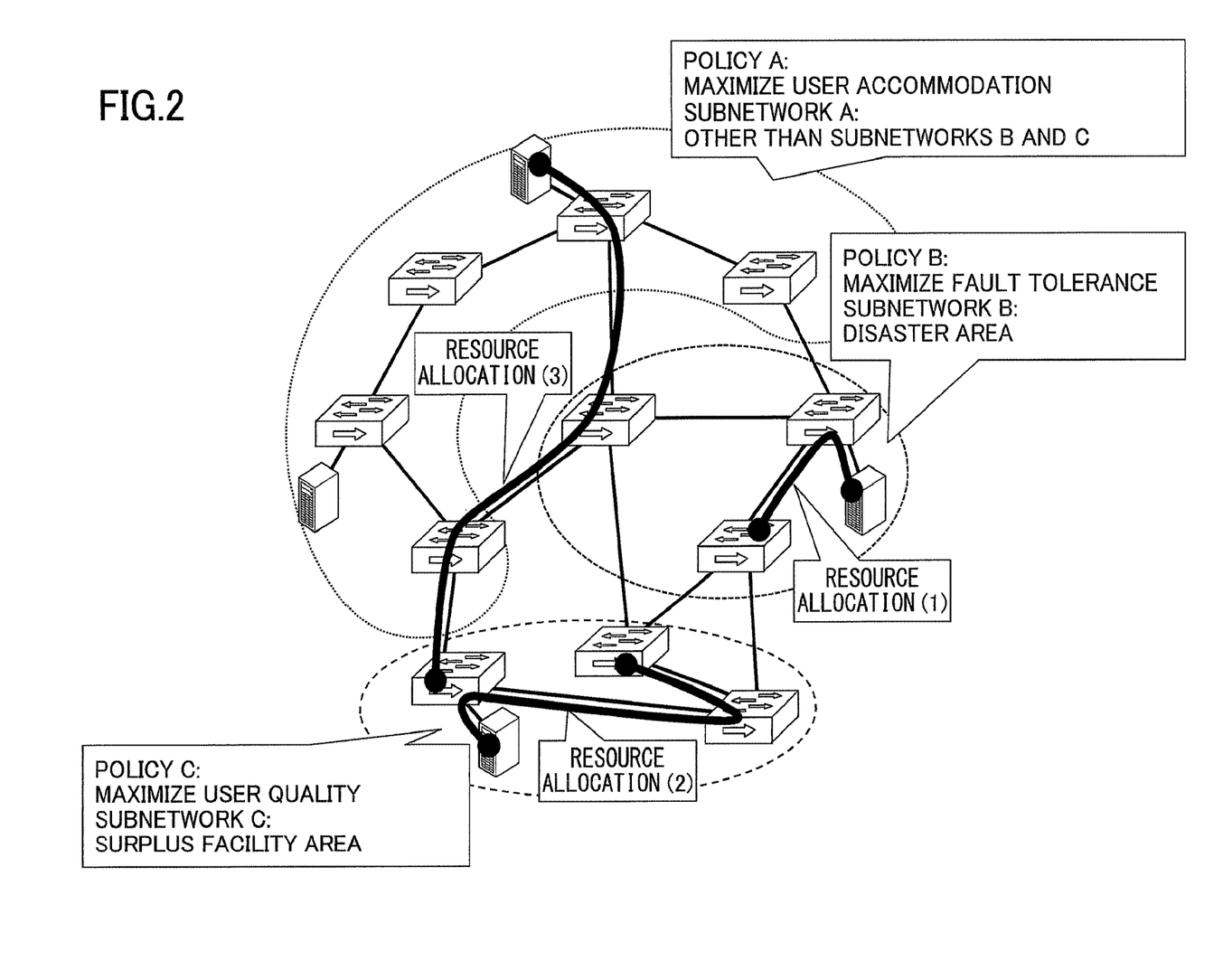
FIG. 2 is a diagram illustrating an example in which multiple resource allocations with different allocation policies are performed on one network.

The conventional technology is capable of allocating resources within a subnetwork to which the same policy is applied (resource allocations (1) and (2) in FIG. 2). However, it has not been clear how to control an allocation as a whole for a resource allocation across subnetworks to which multiple policies are applied (resource allocation (3) in FIG. 2) because control of the multiple policies may contend against each other.

The present invention has been made in view of the above respects, and aims at enabling to allocate resources to a network that includes multiple sections to which different policies are applied.

Means for Solving the Problem

Thereupon, in order to solve the above problems, a route calculation control device includes a calculator configured, among a plurality of nodes constituting a physical network having a plurality of sections to which respective policies different from each other are applied when allocating resources, based on a policy corresponding to a section including a start point node specified in a use request of the resources of the physical network, to calculate a route from the start point node to an end point node specified in the use request; and a controller configured to replace the start point node, among nodes constituting the route calculated by the calculator, with a first node included in a section different from the section including the start point node, so as to cause the calculator to calculate a route to the end point node.

Advantage of the Invention

It is possible to allocate resources to a network that includes multiple sections to which different policies are applied.

EMBODIMENTS OF THE INVENTION

In the following, embodiments of the present invention will be described with reference to the drawings. In the embodiment, a system (referred to as "integration controller 13", below) is introduced into an orchestrator 10, which performs integrated control of resource allocation based on multiple allocation policies without changing the calculation logic of resource allocation based on policies that have mutually different objectives in resource allocation (referred to as "allocation policies", below). The orchestrator 10 is a computer to manage and control the state of resource allocation on the entire network.

The reason why such a configuration is introduced is that in the case of adding a resource allocation of a new allocation policy, it is not necessary to change resource allocations of existing allocation policies, and thereby, system expansion can be made easier. The integration controller 13 performs a process of analyzing contents of a resource allocation request for a certain service; reconfiguring the request; activating a resource allocation for each allocation policy; and integrating the allocation results, so as to obtain an allocation result without inconsistency as a whole. In the following, the system will be described in detail in terms of operation environment, system configuration, operation sequence, algorithm examples of the integration controller 13, and operation examples, in this order.

The operating environment as a prerequisite for operating the system is a virtualized network as illustrated in FIG. 1. In a form of providing services that provides multiple services on a single physical network, resources are allocated to services based on allocation policies specified for respective subnetworks. Note that a "subnetwork" refers to a section of a single physical network (partial network).

A physical network is constituted with transfer nodes Nr represented by a router, service nodes to execute service functions, and links that connect the nodes. Resources of the physical network to be allocated to a service are classified into two types, namely, transfer-related resources and server-related resources.

Transfer-related resources mainly indicate resources of a link between transfer nodes Nr, specifically, the transfer band and the like. Assume that in addition to the transfer band, the transfer latency is set to each link. Server-related resources indicate resources of a service node Ns, specifically, a CPU, a memory, a storage, and the like.

Each of the transfer nodes Nr is provided with a function that is capable of controlling a transfer route in the network by software, such as SDN (Software Defined Network), and the route is controlled by the orchestrator 10 in a centralized way.

The service nodes Ns are commonly capable of executing service functions implemented by software, and the service functions can be executed on any of the service nodes Ns. Management on which of the services is executed on which of the service nodes Ns is executed by the orchestrator 10 similarly to the route control. This management can be implemented by using a general NVF (Network Functions Virtualization), SFC (Service Function Chaining), and the like.

Each service is set with, as requirements for the service to be provided, a transfer band b, (an upper limit of) a transfer latency d, service functions $f=[f_1, f_2, \ldots, f_n]$ to be received on the route ($f_x$ represents a service function, and n represents the number of on-the-route service functions), a start point s of the service, an end point e, and the like.

In the case of a user B in FIG. 1, the requirements are b=50 Mbps, d=20 ms, f=[CPE (Customer Premises Equipment), FW (Firewall))], s=1, and e=6. In addition, as illustrated in FIG. 2, resource allocations based on different allocation policies are performed on the network, and information representing subnetworks to which the allocation policies are applied is stored in the orchestrator 10. In the embodiment, the orchestrator 10 realizes integrated control of resource allocation over multiple allocation policies while satisfying service requirements described above.

Figure 3:
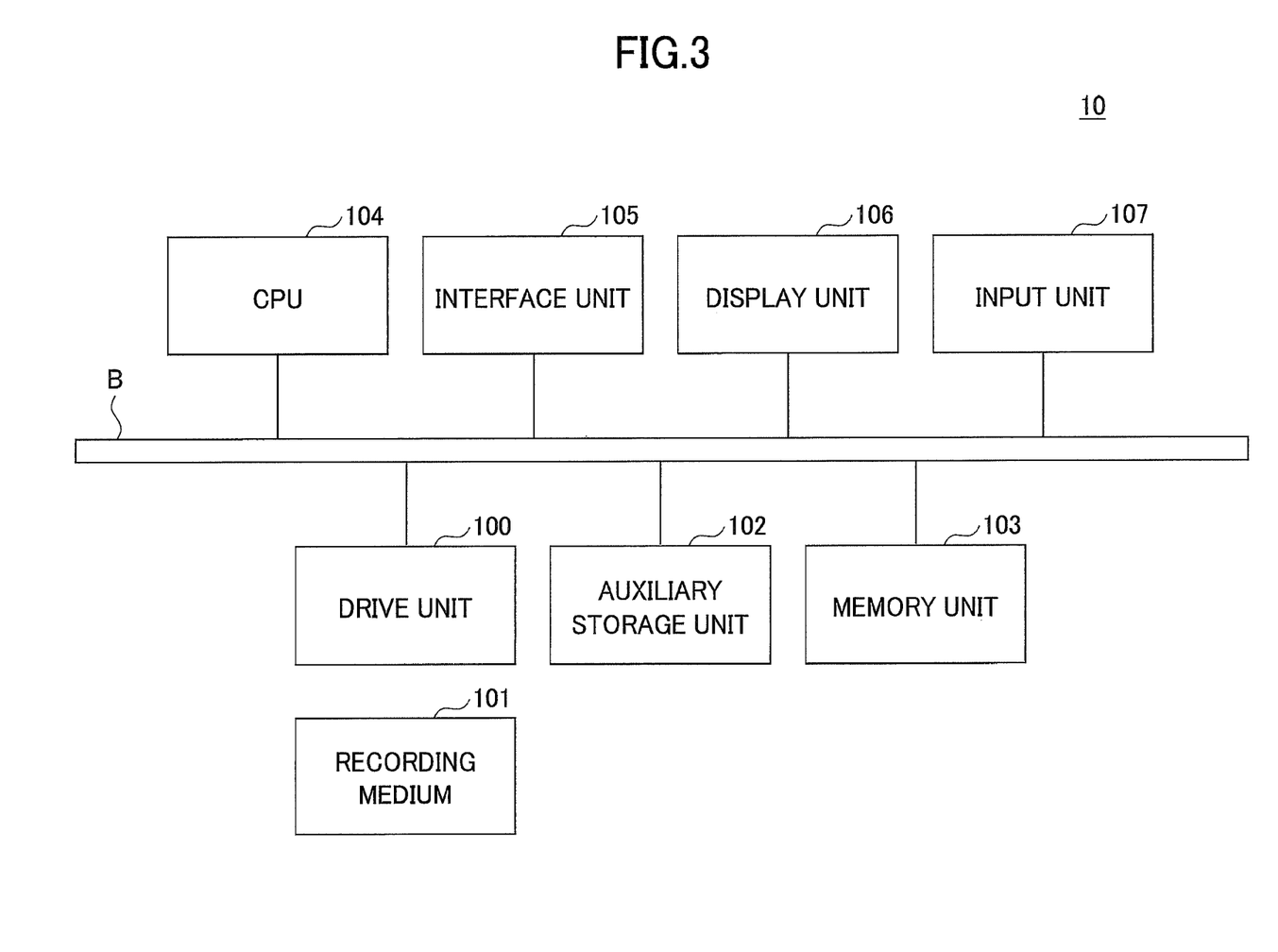
FIG. 3 is a diagram illustrating an example of a hardware configuration of an orchestrator according to an embodiment of the present invention.

FIG. 3 is a diagram illustrating an example hardware configuration of the orchestrator according to the embodiment of the present invention. The orchestrator 10 in FIG. 3 includes a drive unit 100, an auxiliary storage unit 102, a memory unit 103, a CPU 104, an interface unit 105, a display unit 106, and an input unit 107, which are mutually connected by a bus B.

A program that implements processing on the orchestrator 10 is provided with a recording medium 101 such as a CD-ROM. Once the recording medium 101 storing the program is set in the drive unit 100, the program is installed into the auxiliary storage unit 102 from the recording medium 101 via the drive unit 100. However, installation of the program is not necessarily executed from the recording medium 101, and may also be downloaded from another computer via the network. The auxiliary storage unit 102 stores the installed program, and stores required files, data, and the like as well.

Upon receiving a command to activate the program, the memory unit 103 reads out the program from the auxiliary storage unit 102, to load the program. The CPU 104 implements a function related to the orchestrator 10, based on the program loaded in the memory unit 103. The interface unit 105 is used as an interface for connecting with a network. The display unit 106 displays a GUI (Graphical User Interface) and the like by the program. The input unit 107 is constituted with a keyboard, a mouse, and the like, and is used for inputting various operation commands.

Figure 4:
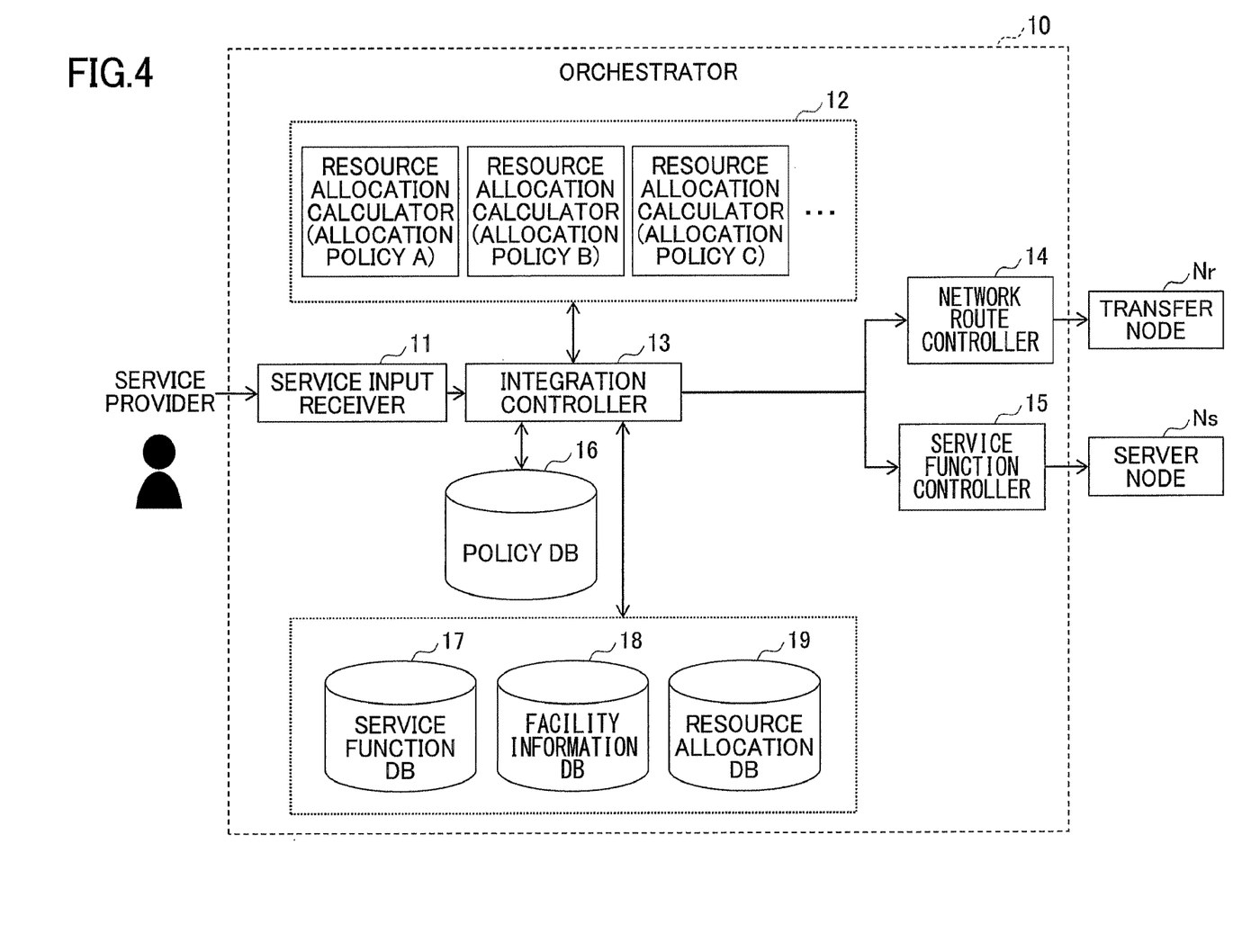
FIG. 4 is a diagram illustrating an example of a functional configuration of an orchestrator according to an embodiment of the present invention.

FIG. 4 is a diagram illustrating an example of a functional configuration of the orchestrator according to the embodiment of the present invention. In FIG. 4, the orchestrator 10 includes a service input receiver 11, multiple resource allocation calculators 12, an integration controller 13, a network route controller 14, and a service function controller 15. These units are implemented by processes which one or more programs installed in the orchestrator 10 cause the CPU 104 to execute. The orchestrator 10 also uses databases including a policy DB 16, a service function DB 17, a facility information DB 18, and a resource allocation DB 19. These databases (storage units) can be implemented, for example, by using the auxiliary storage unit 102 or a storage device or the like that can be connected to the orchestrator 10 via a network.

The service input receiver 11 receives from an operator of a service provider an input of a request for a service to which resources will be newly allocated.

The integration controller 13 controls the entire resource allocation as described above. The integration controller 13 analyzes contents of a resource allocation request for a certain service, reconfigures the request, activates the resource allocation calculators 12 of respective allocation policies, and integrates the allocation results, so as to obtain an allocation result without inconsistency as a whole. Based on an obtained resource allocation result, the integration controller 13 issues a command to allocate resources to the network route controller 14 and the service function controller 15. When analyzing and reconfiguring a resource allocation request, the integration controller 13 refers to information stored in the policy DB 16, the service function DB 17, the facility information DB 18, and the resource allocation DB 19.

The policy DB 16 stores information representing types of allocation policies (a set P of allocation policies) and subnetworks to which allocation policies are applied (each subnetwork $G_x$ to which an allocation policy $x \in P$ is applied). A subnetwork to which an allocation policy is applied does not overlap the other subnetworks. In other words, it is assumed that multiple allocation policies are not applied to a single subnetwork.

The resource allocation DB 19 stores information on resources that have been allocated to existing services. An existing service is a service to which resources have already been allocated.

The service function DB 17 stores, for each service function, the amount of resources necessary for executing the service function (e.g., for a function A, two cores of CPU, 1 GB of memory, and 10 GB of storage)).

The facility information DB 18 stores information on the physical network (connection information between the transfer nodes Nr and the service nodes Ns, the transfer band and transfer latency of each link, and the server capacity, etc.).

The resource allocation calculators 12 exist for respective allocation policies. Each of the resource allocation calculators 12 calculates a resource allocation based on the allocation policy specified for the resource allocation calculator 12. The resource allocation calculator 12 receives as input requirements of a new service and the network information, and outputs a resource allocation result.

A resource allocation result is represented by a route allocation $r=[n_1, n_2, \ldots, n_m]$ (m represents a route length), and a server allocation $s=[s_1, s_2, \ldots, s_n]$ (n represents the number of on-the-route service functions, and $s_x$ represents an x-th node on the route on which a service functions $f_x$ is to be executed). In the case of the example of the user B in FIG. 1, the resource allocation result is the route allocation $r=[1, 2, 7, 2, 4, 8, 4, 6]$, and the server allocation $s=[7, 8]$. In other words, the route allocation r includes not only the transfer nodes Nr, but also the service nodes Ns.

The network route controller 14 controls the transfer nodes Nr based on a resource allocation result. The service function controller 15 controls the service nodes Ns based on a resource allocation result.

Figure 5:
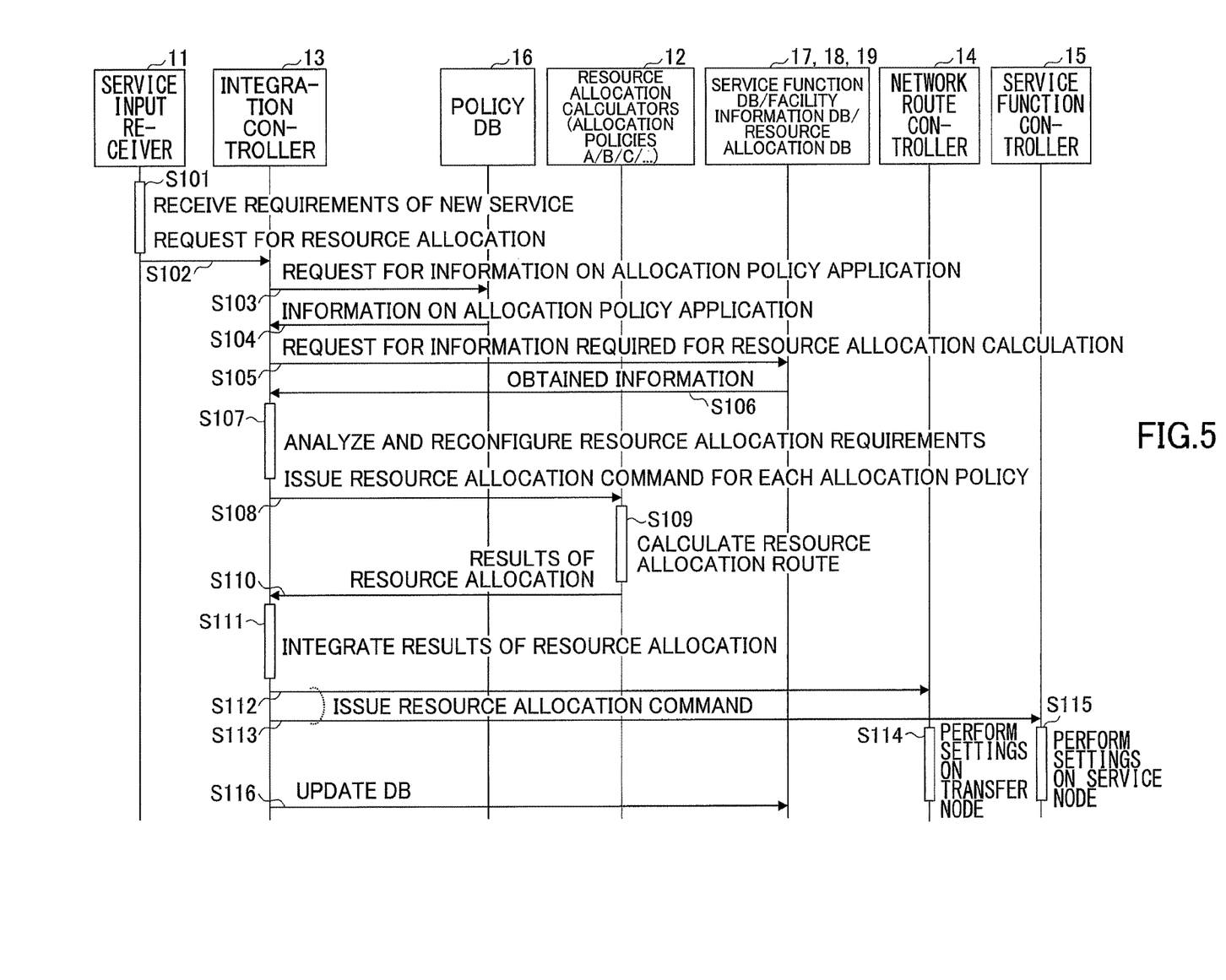
FIG. 5 is a sequence chart for describing an example of processing steps executed by an orchestrator.

In the following, processing steps executed by the orchestrator 10 will be described. FIG. 5 is a sequence chart for illustrating an example of processing steps executed by the orchestrator.

In response to receiving an input of requirements for a new service from the operator of the service provider (S101), the service input receiver 11 transmits a resource allocation request for the service to the integration controller 13 (S102).

Next, from the policy DB 16, the integration controller 13 obtains information representing types of allocation policies and subnetworks to which respective allocation policies are to be applied (referred to as the "allocation policy application information", below)) (S103 and S104). Next, the integration controller 13 obtains information necessary for resource allocation calculation, such as physical network information, allocated resource information, and information on service functions, from the service function DB 17, the facility information DB 18, and the resource allocation DB 19 (S105 and S106).

Next, based on the information obtained from the DBs, the integration controller 13 analyzes the resource allocation request and reconfigures the requirements (S107), and calls the resource allocation calculators 12 corresponding to the respective allocation policies (S108). At this time, based on the allocation policy application information, the integration controller 13 determines an allocation policy specified for each of the resource allocation calculators 12.

Each of the resource allocation calculator 12 calculates a resource allocation route based on the specified allocation policy (S109), and outputs a resource allocation result to the integration controller 13 (S110).

Next, the integration controller 13 integrates the resource allocation results of the allocation policies to obtain the entire resource allocation route (S111).

Next, based on the obtained resource allocation route, the integration controller 13 issues a command to allocate resources to the network route controller 14 and the server function controller (S112 and S113). In response to the command, the network route controller 14 performs settings for allocating resources for the service on the transfer nodes Nr (S114). In response to the command, the service function controller 15 performs settings for allocating resources for the service on the service nodes Ns (S115).

Next, the integration controller 13 reflects the resource allocation result in the resource allocation DB 19 (S116).

Next, an example of specific processing steps (an algorithm) of reconfiguring a resource allocation request, and integrating a resource allocation result in the integration controller 13 will be described. As a principle of the processing steps, resource allocation calculation according to the allocation policy for each subnetwork on the route from the start point to the end point of the service, is executed sequentially while adding changes to the service requirements, to settle an allocation result.

Specifically, on the entire network, resource allocation is performed for a requested service, based on an allocation Policy(s) to be applied to the start point s, to obtain a temporary allocation result. Here, Policy(x) is a function that represents an allocation policy to be applied to a node x. Note that the allocation policy applied to the node x is the allocation policy to be applied to a subnetwork to which the node x belongs.

In the temporary allocation result, resources allocated within the subnetwork $G_{Policy(s)}$ to which Policy(s) is applied are settled. Next, in the temporary allocation result, a boundary node to a subnetwork to which an allocation policy other than Policy(s) is applied is newly set as s. The other requirements are also updated in consideration of the settled allocation result. Repeating the above resource calculation sequentially under the updated requirements enables to perform a resource allocation that is consistent with the allocation policies on the entire network.

Figure 6:
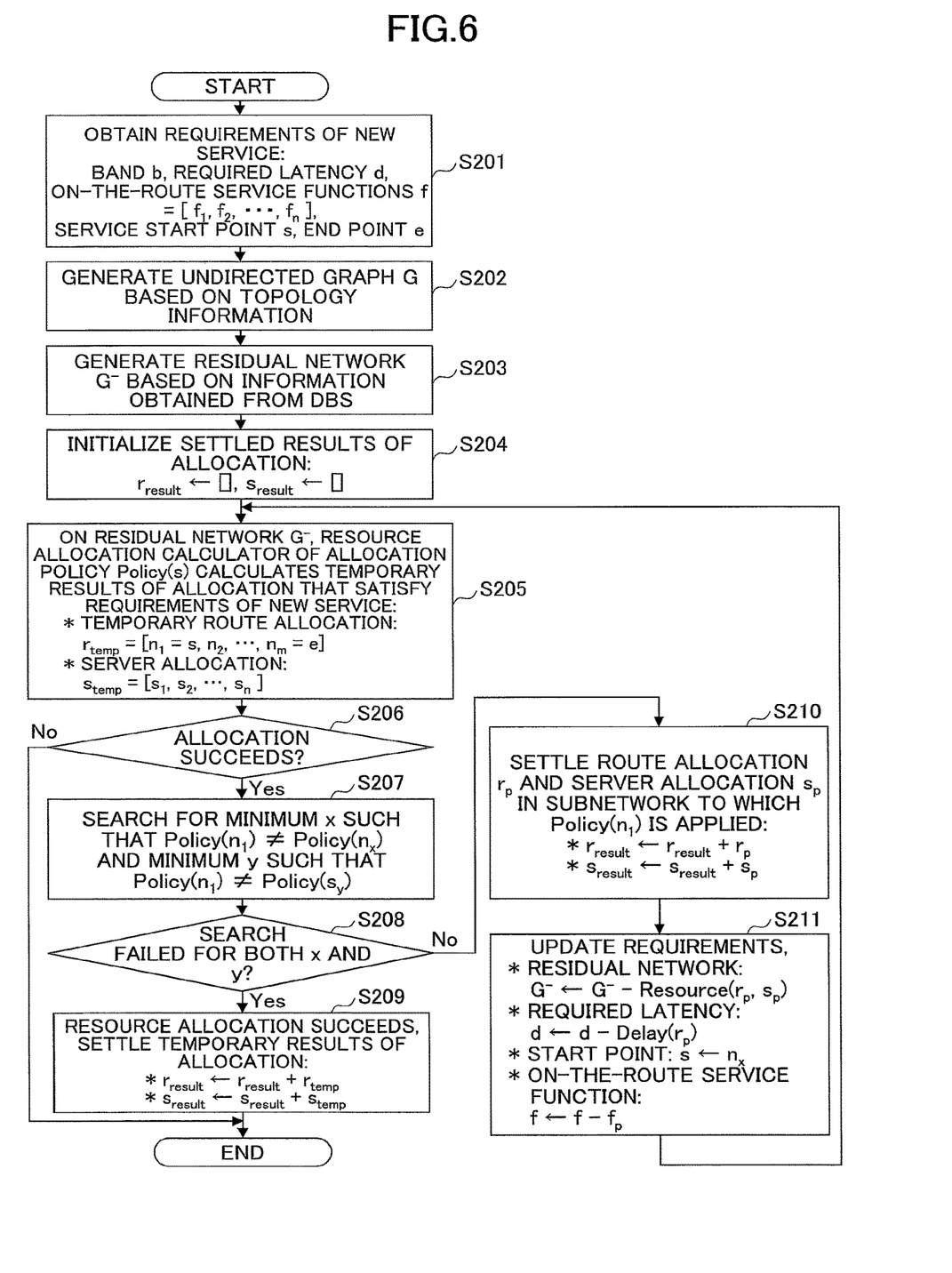
FIG. 6 is a flowchart for describing an example of processing steps executed by an integration controller.

The above processing steps will be described in further detail. FIG. 6 is a flowchart for describing an example of the processing steps executed by the integration controller. The process starts upon arrival of a resource allocation request for a new service (S102). Here, assume that at the start of Step S201, Steps S103 to S106 in FIG. 5 have been completed.

At Step S201, the integration controller 13 obtains requirements of the new service from the resource allocation request.

Next, based on topological information on the physical network included in the physical network information obtained from the facility information DB 18, the integration controller 13 generates a weighted undirected graph G that represents the physical network (S202). For each link in the undirected graph G, a transfer latency is given as a weight, and a capacity constraint (transfer band) is also set.

Next, based on the allocated resource information obtained from the resource allocation DB 19, the integration controller 13 generates a virtual network (referred to as a "residual network G$^-$", below) obtained by subtracting resource capacities allocated to the existing services from the undirected graph G (S203).

Next, the integration controller 13 sets parameters of the requirements obtained at Step S201 as the band b, the required latency d, the on-the-route functions $f=[f_1, f_2, \ldots, f_n]$, the start point s and the end point e of the service, and initializes variables to represent settled route allocation "$r_{result}$" and settled server allocation "$s_{result}$" ($r_{result} \leftarrow [\ ]$, and $s_{result} \leftarrow [\ ]$) (S204).

Next, the integration controller 13 causes the resource allocation calculator 12 corresponding to the allocation policy Policy(s), to calculate a temporary route allocation $r_{temp}=[n_1=s, n_2, \ldots, n_m=e]$ and a temporary server allocation $s_{temp}=[s_1, s_2, \ldots, s_n]$ on the residual network G$^-$, so as to satisfy the requirements of the resource allocation request (S205). Here, m represents a route length.

If the resource allocation calculation has failed (No at S206), resources cannot be allocated to the corresponding request due to insufficient resources, and thus, the process in FIG. 6 ends.

If the resource allocation calculation has succeeded (Yes at S206), the integration controller 13 settles the resource allocation in the subnetwork $G_{Policy(s)}$ to which Policy(s) has been applied in the temporary allocation result ($r_{temp}$, $s_{temp}$). Specifically, the integration controller 13 searches for a minimum x such that Policy($n_1$)≠Policy($n_x$) (i.e., a first transfer node Nr to which a different allocation policy is applied), and a minimum y such that Policy($n_1$)≠Policy($s_y$)) (S207).

If both x and y do not exist (Yes at S208), all of the nodes in the temporary allocation result are within the subnetwork $G_{Policy(s)}$. Therefore, the integration controller 13 adds the temporary allocation result to the settled allocation result ($r_{result} \leftarrow r_{result}+r_{temp}$, and $s_{result} \leftarrow s_{result}+s_{temp}$) (S209), and ends the process as a successful allocation.

If x has been found or x and y have been found (No at S208), the temporary allocation result crosses over subnetworks to which different allocation policies are to be applied. There is no case where y is found and x is not found. This is because $n_1$ is always Policy($n_1$).

Then, the integration controller 13 settles the route allocation $r_p=[n_1, n_2, \ldots, n_x]$, and the server allocation $s_p=[s_1, s_2, \ldots, s_{y-1}]$ ($r_{result} \leftarrow r_{result}+r_p$, and $s_{result} \leftarrow s_{result}+s_p$) in the subnetwork to which Policy($n_1$) is applied (S210). Here, if y=1, $s_p=[\ ]$; or if y does not exist, $s_p=s_{temp}$.

Next, the integration controller 13 changes the requirements (S211) and returns to the resource allocation calculation based on the next allocation policy.

When updating the requirements, the residual network G$^-$, the required latency, the start point of the service, and the on-the-route service function are updated. When updating the residual network G$^-$, resources to be consumed by the settled resource allocation (referred to as "Resource($r_p$, $s_p$)", below) are subtracted from the current residual network G$^-$ (G$^- \leftarrow$ G$^-$ −Resource ($r_p$, $s_p$)).

When updating the required latency, a transfer latency in the case of transfer along rp (referred to as "Delay($r_p$)", below) is subtracted from the current required latency (d←d−Delay([$r_p$])).

The starting point of the service is updated to $n_x$ (s←$n_x$).

When updating the on-the-route service functions, the service functions $f_p=[f_1, f_2, \ldots, f_{y-1}]$ that have already been executed are excluded from f (f←f−$f_p$). Here, $f_p=[\ ]$ if y=1, or $f_p=f$ if y does not exist.

As such, requirements are generated in which the requirements satisfied by the route allocation $r_{result}$ and the server allocation $s_{result}$ are excluded. In other words, the requirements are divided.

Figure 7:
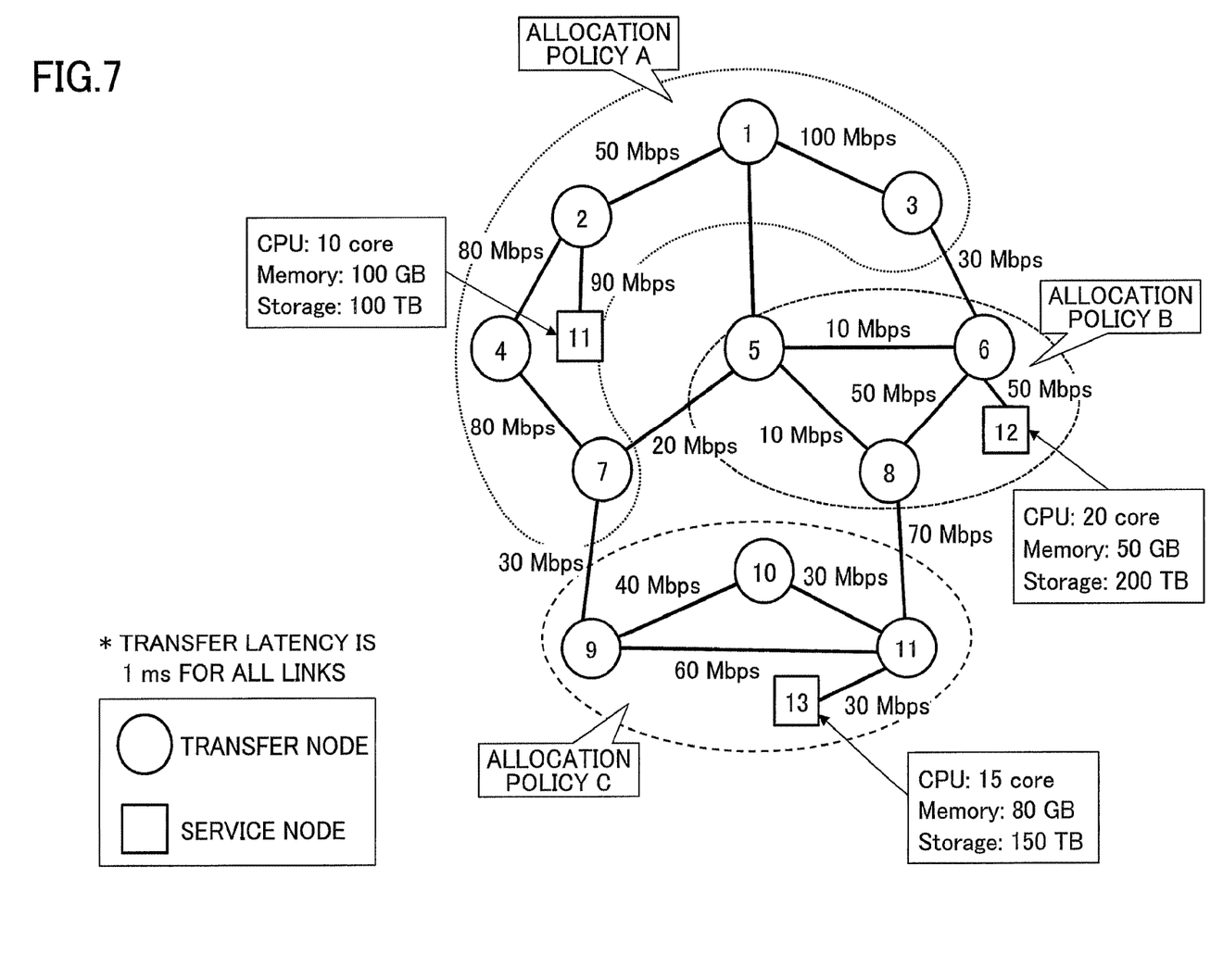
FIG. 7 is a diagram illustrating a network and allocation policies used in execution examples.

Regarding the processing steps in FIG. 6, two execution examples (execution example 1 and execution example 2) will be described below. FIG. 7 is a diagram illustrating a network and allocation policies used in the execution examples.

Assume that the bands of links and the capacities of service nodes illustrated in FIG. 7 are residual amounts of resources obtained by subtracting the amounts of allocated resources from the amounts of the physical resources, respectively.

Assume that three allocation policies (P=[A, B, C]) are to be applied.

Assume that the allocation policies are applied to respective subnetworks of $G_A=(V_A, E_A)$, $G_B=(V_B, E_B)$, and $G_C=(V_C, E_C)$. Here, $V_x$ and $E_x$ are sets of nodes and links, respectively, to which an allocation policy x ∈P is applied; specifically, $V_A$=[1, 2, 3, 4, 7, 11]; $E_A$=[(1, 2), (1, 3), (2, 4), (2, 11), (4, 7); $V_B$=[5, 6, 8, 12]; $E_B$=(5, 6), (5, 8), (6, 8), (6, 12)]; =[9, 10, 11, 13]; and $E_C$=[(9, 10), (9, 11), (10, 11), (11, 13)].

As for the links [(1, 5) (3, 6) (5, 7), (7, 9), (8, 11)] that go across the subnetworks, any of the allocation policies may be applied. Also assume that as service functions, a and b are prepared; execution of A consumes one core of CPU, 5 GB of memory, and 50 TB of storage, and execution of B consumes two cores of CPU, 10 GB of memory, and 100 TB of storage.

Execution Example 1

Consider a resource allocation for requirements of a new service (band b=5 Mbps, required latency d=4 ms, on-the-route service function f=[a], start point s=node 1, and end point e=node 4).

Figure 8:
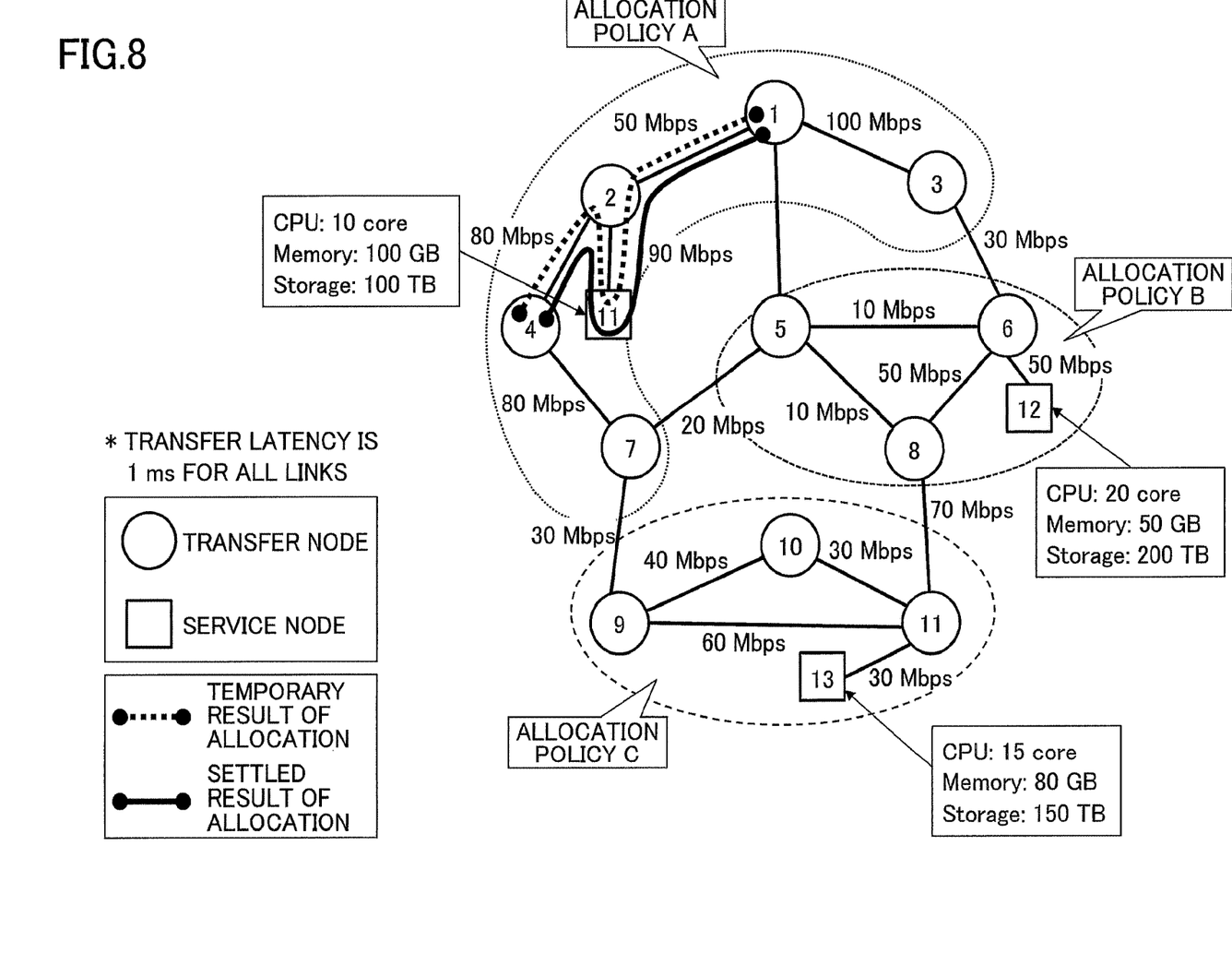
FIG. 8 is a diagram illustrating calculation details of a resource allocation according to an execution example 1.

FIG. 8 illustrates calculation details of the resource allocation. The first resource allocation calculation is performed under the following conditions.

<Conditions for First Resource Allocation Calculation>
allocation policy: Policy(s)=Policy(1)=allocation policy A
residual network: the network in FIG. 8
requirements of new service: band b=5 Mbps, required latency d=4 ms, on-the-route service function f=[b], start point s=node 1, end point e=node 4

As a result of the calculation, assume that a route allocation $r_{temp}$=[1, 2, 11, 2, 4] and a server allocation $s_{temp}$=[11] are obtained as the temporary allocation result. Next, a minimum x such that Policy $(n_1)\neq$Policy$(n_x)$ and a minimum y such that Policy $(n_1)\neq$Policy$(s_y)$ are searched for; however, all the nodes of the temporary allocation result are within the subnetwork $G_{policy(s)}$. Therefore, x and y are not found. Therefore, the temporary allocation route is settled as ($r_{result} \leftarrow r_{result}+r_{temp}$=[ ]+[1, 2, 4]=[1, 2, 4], and $s_{result} \leftarrow s_{result}+s_{temp}$=[ ]+[11]=[11]), and the process is terminated as a successful allocation.

Execution Example 2

Figure 9:
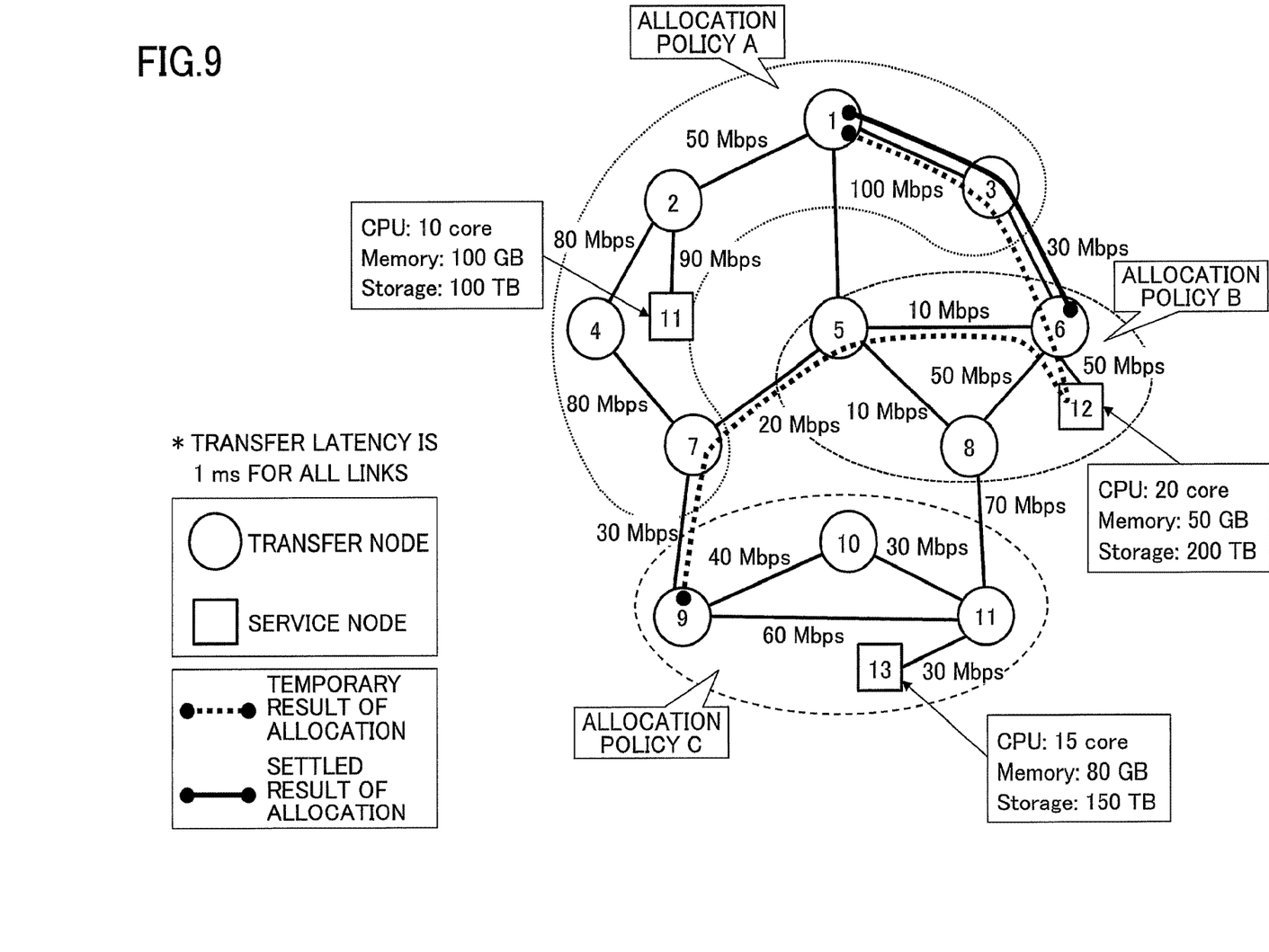
FIG. 9 is a first diagram illustrating calculation details of a resource allocation according to an execution example 2.
Figure 10:
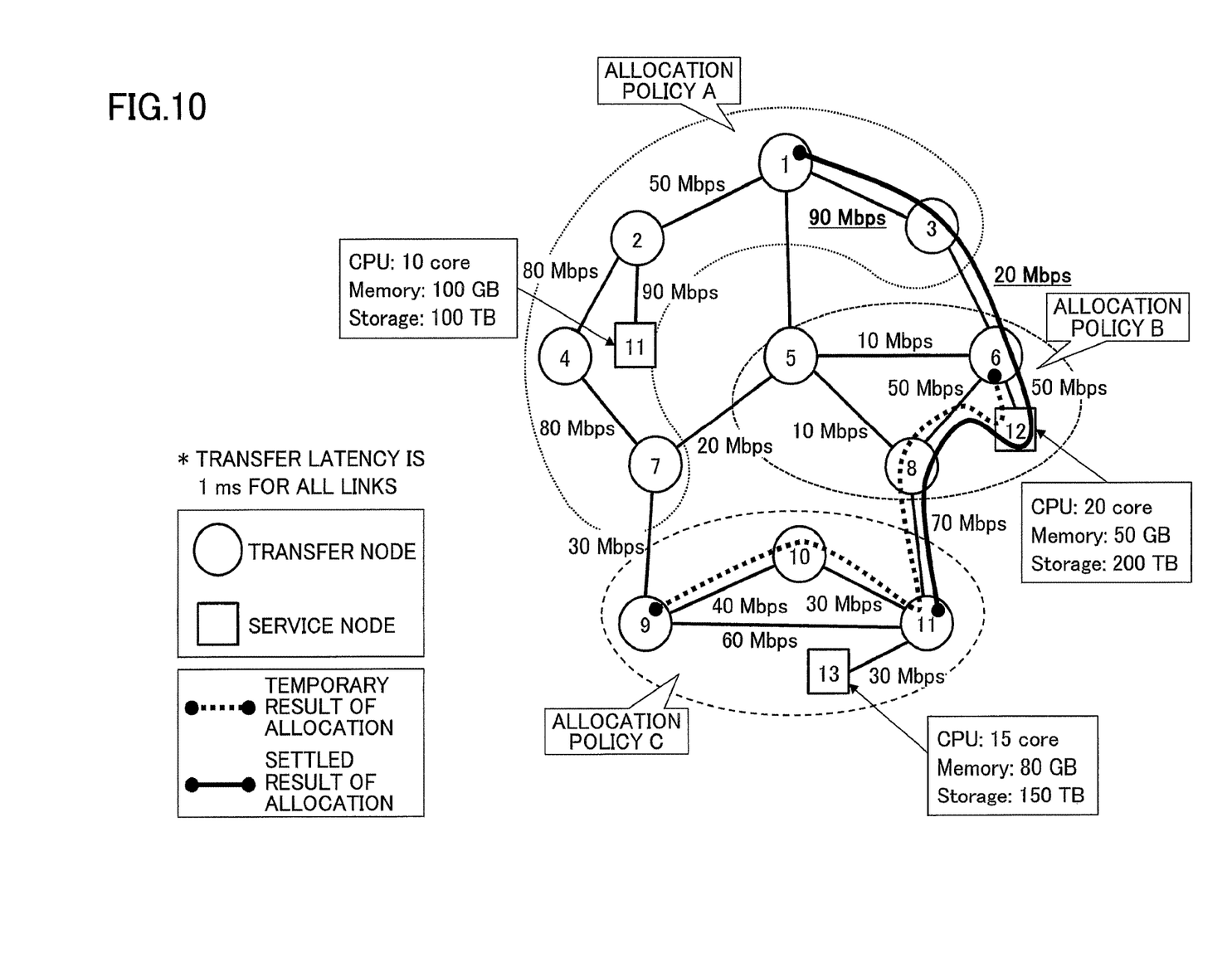
FIG. 10 is a second diagram illustrating calculation details of the resource allocation according to the execution example 2.
Figure 11:
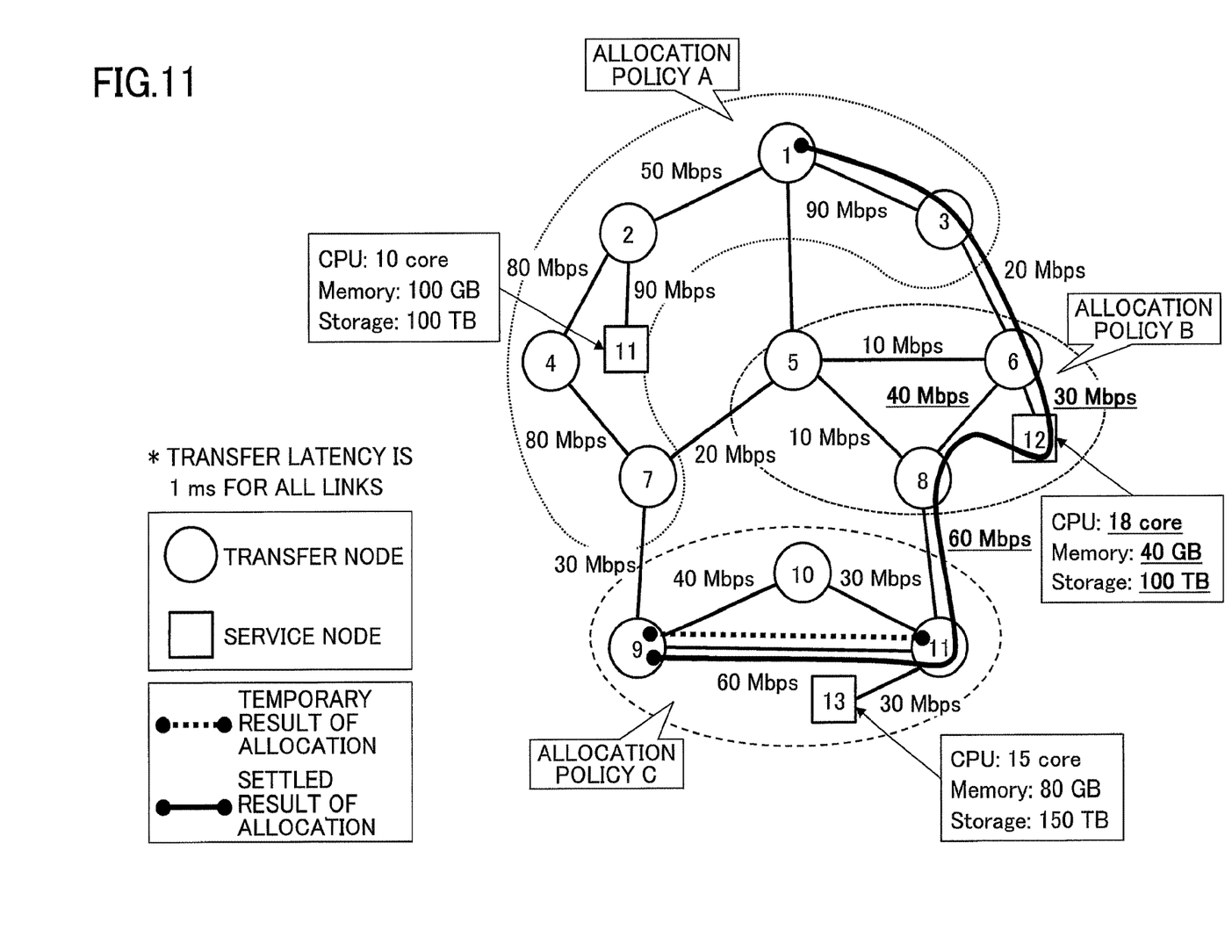
FIG. 11 is a third diagram illustrating calculation details of the resource allocation according to the execution example 2.

Consider a resource allocation for requirements for a new service (band b=10 Mbps, required latency d=10 ms, on-the-route service function f=[b], start point s=1, and end point e=9). Calculation details of resource allocation are illustrated in FIGS. 9 to 11. The first resource allocation calculation is performed under the following conditions.

<Conditions for First Resource Allocation Calculation>
allocation policy: Policy(s)=Policy(1)=allocation policy A
residual network: the network in FIG. 9
requirements of new service: band b=10 Mbps, required latency d=10 ms, on-the-route service function f=[b], start point s=1, end point e=9

Assume that an allocation route $r_{temp}$=[1, 3, 6, 12, 6, 5, 7, 9] and $s_{temp}$=[12] are obtained as a result of the calculation as the temporary allocation result. A minimum x such that Policy$(n_1)\neq$Policy $(n_x)$ and a minimum y such that Policy $(n_1)\neq$Policy$(s_y)$ turn out to be x=3 and y=1. Therefore, the route allocation $r_p$=[$n_1$, $n_2$, $n_3$]=[1, 3, 6] and the server allocation $s_p$=[ ] in the subnetwork to which Policy$(n_1)$ is applied are settled as ($r_{result} \leftarrow r_{result}+r_{temp}$=[ ]+[1, 3, 6]=[1, 3, 6], and $s_{result} \leftarrow s_{result}+s_{temp}$=[ ]+[ ]=[ ]). Next, the requirements are updated as follows.

<Requirements Update (First Time)>
residual network: the network in FIG. 10 (resources subject to subtraction are underlined)
starting point: $s=n_3=6$
required latency: d=10−Delay([1, 3, 6])=10−2=8 [ms]
on-the-route service function: f=f−$f_p$=[b]−[ ]=[b]

The second calculation of the resource allocation is performed under the following conditions.

<Conditions for Second Resource Allocation Calculation>
allocation policy: Policy(s)=Policy(3)=allocation policy B
residual network: the network in FIG. 10
requirements for new service: band b=10 Mbps, required latency d=8 ms, on-the-route service function f=[b], start point s=3, end point e=9

As a result of the calculation, assume that a route allocation $r_{temp}$=[6, 12, 6, 8, 11, 10, 9] and a server allocation $s_{temp}$=[12] are obtained as the temporary allocation result. A minimum x such that Policy$(n_1)\neq$Policy $(n_x)$ and a minimum y such that is Policy$(n_1)\neq$Policy$(s_y)$ turn out to be x=5 and y=none. Therefore, the route allocation $rp$=[$n_1$, . . . , $n_5$]=[6, 12, 6, 8, 11] and the server allocation $s_p$=$s_{temp}$=[12] in the subnetwork to which Policy$(n_1)$ is applied are settled as ($r_{result} \leftarrow r_{result}+r_{temp}$=[1, 3, 6]+[6, 12, 6, 8, 11]=[1, 3, 6, 12, 6, 8, 11], and $s_{result} \leftarrow s_{result}+s_{temp}$=[ ]+[12]=[12]). Next, the requirements are updated as follows.

<Requirements Update (Second Time)>
residual network: the network in FIG. 11 (resources subject to subtraction are underlined)
starting point: $s=n_5=11$
required latency: d=10−Delay([6, 12, 6, 8, 11])=8−4=4 [ms]
on-the-route service function: f=f−$f_p$=[b]−[b]=[ ] The third resource allocation calculation is performed under the following conditions.

<Conditions for Third Resource Allocation Calculation>
allocation policy: Policy(s)=Policy(11)=allocation policy C
residual network: the network in FIG. 11
requirements of new service: band b=10 Mbps, required latency d=4 ms, on-the-route service function f=[ ], start point s=11, end point e=9

Assume that an allocation route $r_{temp}$=[11, 9] and $s_{temp}$=[ ] are obtained as a result of the calculation as the temporary allocation result. A minimum x such that Policy $(n_1)\neq$Policy $(n_x)$ and a minimum y such that Policy$(n_1)\neq$Policy$(s_y)$ are searched for; however all the nodes of the temporary allocation result are within the subnetwork $G_{Policy(s)}$, and x and y are not found. Thereupon, the temporary allocation route is settled as ($r_{result} \leftarrow r_{result}+r_{temp}$=[1, 3, 6, 12, 6, 8, 11]+[11, 9]=[1, 3, 6, 12, 6, 8, 11, 9], and $s_{result} \leftarrow s_{result}+s_{temp}$=[11]+[ ]=[11]), and the process is terminated as a successful allocation.

Note that in the embodiment, the same combination of allocation policies is applied to all services. However, if an allocation policy adapting to each service is registered in the registration information of the policy DB 16, it is possible to apply different combinations of allocation policies to respective services. Also, in the embodiment, priorities of all the allocation policies are treated as the same; however, it is also possible to take into consideration priorities among the allocation policies. For example, in the execution example 2, if the allocation policy 2 is maximization of fault tolerance, and the subnetwork 2 to which allocation policy 2 is applied is a disaster-affected area, it is desirable to avoid allocating resources of the subnetwork 2 to a new service if possible. In such a case, the requirements may be modified in the first resource allocation calculation, for example, such that resource allocation calculation is to be performed not on the entire residual network, but on a network excluding the subnetwork 2 from the residual network. Such a modification enables to avoid allocating resources to a subnetwork having a low allocation priority.

As described above, according to the embodiment, it is possible to allocate resources to a network that includes multiple sections to which different policies are applied. Consequently, it becomes possible to operate a network more flexibly.

In the embodiment, the orchestrator 10 is an example of a route calculation control device. The resource allocation calculator is an example of a calculator. The integration controller 13 is an example of a controller. The new service is an example of a use request.

As above, the embodiments of the present invention have been described in detail. Note that the present invention is not limited to such specific embodiments, and various variations and modifications may be made within the scope of the subject matters of the present invention described in the claims.

The present patent application claims priority based on Japanese Patent Application No. 2016-098807 filed on May 17, 2016, and entire contents of the Japanese Patent Application are incorporated herein by reference.

LIST OF REFERENCE SYMBOLS 10 orchestrator
11 service input receiver
12 resource allocation calculator
13 integration controller
14 network route controller
15 service function controller
16 policy DB
17 service function DB
18 facility information DB
19 resource allocation DB
100 drive unit
101 recording medium
102 auxiliary storage unit
103 memory unit
104 CPU
105 interface unit
B bus

The invention claimed is:

1. A route calculation control device, comprising:
a memory configured to store information regarding a physical network; and
processing circuitry configured to
receive a use request of the resources of the physical network,
based on the information stored in the memory, calculate, among a plurality of nodes constituting the physical network having a plurality of sections, corresponding to physically separate sections of network elements, to which respective resource allocation policies different from each other are applied when allocating resources, based on a first policy corresponding to a first section including a start point node specified in a use request of the resources of the physical network, a first route from the start point node toward an end point node specified in the use request; and
when the first route crosses into a second section of the physical network which applies a second policy that is different than the first policy, settle a portion of the first route that includes nodes up to and including a first node in the second section as part of a final allocated route, replace the start point node, among nodes constituting the calculated first route, with the first node included in the second section and calculate a second route toward the end point node based on the second policy, and
settle at least a portion of the calculated second route that resides within the second section as part of the final allocated route,
wherein each of the respective resource allocation policies are specifically for achieving at least one of minimization of a resource usage rate, maximization of a number of accommodated services, maximization of user quality, maximization of fault tolerance, and minimization of power consumption.

2. The route calculation control device as claimed in claim 1, wherein the processing circuitry
calculates the first route to satisfy first requirements relating to use of the resources of the physical network included in the use request, and
calculates the second route to satisfy requirements in which second requirements satisfied by the portion of the first route that is settled as part of the allocated route are excluded from the first requirements.

3. A method implemented on a route calculation control device that includes a memory configured to store information regarding a physical network and processing circuitry, the method comprising:
receiving a use request of the resources of the physical network;
based on the information stored in the memory, calculating, among a plurality of nodes constituting the physical network having a plurality of sections, corresponding to physically separate sections of network elements, to which respective resource allocation policies different from each other are applied when allocating resources, based on a first policy corresponding to a first section including a start point node specified in a use request of the resources of the physical network, a first route from the start point node toward an end point node specified in the use request;
when the first route crosses into a second section of the physical network which applies a second policy that is different than the first policy, settling a portion of the first route that includes nodes up to and including a first node in the second section as part of a final allocated route, replacing the start point node, among nodes constituting the calculated first route, with the first node included in the second section, and calculating a second route toward the end point node based on the second policy; and
settling at least a portion of the calculated second route that resides within the second section as part of the final allocated route,
wherein each of the respective resource allocation policies are specifically for achieving at least one of minimization of a resource usage rate, maximization of a number of accommodated services, maximization of user quality, maximization of fault tolerance, and minimization of power consumption.

4. The method of claim 3, further comprising:
calculating the first route to satisfy first requirements relating to use of the resources of the physical network included in the use request, and
calculating the second route to satisfy requirements in which second requirements satisfied by the portion of the first route that is settled as part of the allocated route are excluded from the first requirements.

* * * * *